3,509,098
PROCESS FOR THE MANUFACTURE OF FINELY DIVIDED INSOLUBLE AND INFUSIBLE MELAMINE - FORMALDEHYDE SOLIDS OF LARGE INNER SURFACE
Jean Curchod, Paris, and Roland Cheritat, Le Perreux-sur-Marne, France, and Franz Rudolf Widmer and Gustav Widmer, Basel, Alfred Renner, Munchenstein, and Hans Batzer, Arlesheim, Switzerland, assignors to Ciba Limited, Basel, Switzerland, a company of Switzerland
No Drawing. Continuation-in-part of application Ser. No. 389,221, Aug. 12, 1964. This application Nov. 14, 1968, Ser. No. 775,963
Claims priority, application Switzerland, Aug. 23, 1963, 10,437/63
Int. Cl. C08g 9/30
U.S. Cl. 260—67.6          3 Claims

ABSTRACT OF THE DISCLOSURE

A process for the manufacture of finely dispersed insoluble and infusible solid melamine-formaldehyde condensates useful as reinforcing agents for rubber which comprises forming a solid phase from an aqueous solution of melamine and formaldehyde at a molecular ratio of from 1:1.5 to 1:6 and a temperature of from 0° to 140° C., preferably 20° C. to 100° C. and at a pH value of 5 to 0, said aqueous solution further containing dissolved a surface active agent, substantially freeing said solid phase from inorganic salts, removing water at a temperature of 30° to 160° C. and comminuting the resultant product to an average particle size below $5\mu$.

---

This application is a continuation-in-part application of our copending application Ser. No. 389,221, filed Aug. 12, 1964, now abandoned.

Numerous technical processes require the use of finely dispersed, relatively inert solid materials that are insoluble, infusible and physiologically acceptable. They should have advantageously a large specific surface area, as fillers, pulverulent vehicles, reinforcing media or thickening agents. In the past nearly exclusively inorganic substances have been thus used, such as silica gel, alumina, calcium silicates, calcium carbonate, baryta, magnesia or gypsum. These substances have a relatively high specific gravity and this is undesirable for some structural purposes. Moreover, especially in the rubber industry, very large quantities of carbonblack are being used but, apart from its reinforcing effect carbonblack has the considerable drawback that its black color precludes it from many uses.

It has now been found that a new type of finely divided, insoluble and infusible fillers and vehicles having a specific surface area larger than 100 square meters per gram are obtained by forming a solid phase from an aqueous solution of melamine and formaldehyde at a molecular ratio of from 1:1.5 to 1:6 at temperature ranging from 0° to 140° C., preferably from 20° to 100° C., and at a pH value ranging from 5 to 0, said aqueous solution further containing dissolved a surface active agent, the molecule of which is made up of a hydrophobic group and a hydrophilic group, said surface active agent having a molecular weight of at most about 1000, whereby a solid phase is formed and separated from the said solution and said separated solid phase is then substantially freed from inorganic salts, the water subsequently is removed from said solid phase by azeotropic distillation with the aid of a hydrocarbon or halogenated hydrocarbon which boiled between 30° C. and 160° C., and the obtained cured, insoluble and infusible product is then disagglomerated to an average particle size smaller than $5\mu$, the so-obtained powder having a specific surface area greater than 100 square meters per gram.

In the conventional processes for the manufacture of melamine-formaldehyde resins it is generally ensured by suitable measures, for example by an early stopping of the resinification reaction or by reacting the components within a pH range of 5 to 10, that products are obtained that are soluble or at least still fusible so that they can be shaped and cured subsequently. In contradistinction to this the insoluble, infusible products manufactured by the present process are cured resins that can no longer be shaped and cured at the same time.

In performing the present process 1 mol of melamine may be reacted with 1.5 to 6 mols of formaldehyde in an acid aqueous medium, whereupon cross-linked, insoluble and infusible products are obtained directly. It is, however, more advantageous to start from precondensates prepared by reacting appropriate proportions of melamine and formaldehyde within a pH range from 5 to 10. When the precondensate is acidified to pH 0 to 5, a cross-linked melamine-formaldehyde resin is obtained in the form of a gel or of an amorphous precipitate.

To keep the pH value of the reaction mixture—which value changes in the course of the condensation—constant within the individual desired range, it is advantageous to perform the reaction in the presence of a buffer substance such as potassium hydrogen phthalate, ammonium phosphates, monoethanolamine phosphates or neutral ammonium tartrate.

Instead of monomeric formaldehyde there may be used for the reaction with melamine its polymers, such as paraformaldehyde or trioxane.

The concentration of the reactants or of the precondensate in the aqueous solution may vary within wide limits, though in general a concentration below 25% by weight is preferred. The time taken by the condensation depends largely on the temperature of the reaction mixture which is chosen from within the range from 0° to 140° C.

A further condition of the present process is that the curing of the melamine-formaldehyde resin to a solid phase is carried out in the presence of one or several surface-active substances, which may be either ionic or non-ionic, for example cationic quaternary ammonium salts or anionic fatty alcohol sulfonates, alkyl-arylsulfonates, salts of sulfosuccinic acid esters, mono-glyceride sulfates or non-ionic polyalkylene ethers. In solution, especially in water, the surface-active substances lower the surface tension and interfacial tension of the liquids. The general properties and behavior of surface-active agents are due to the dual character of the molecules of these substances. Their molecules are made up of two parts, a relatively large, elongated part, the hydrophobic group, and a small solubilizing, polar group, the hydrophilic group. In comparison to the protective colloids which have macromolecular character (M>1000) and increase strongly the viscosity of aqueous solutions, the surface-active substances are in general low molecular weight substances (M<1000) which have no great influence on the viscosity of aqueous solutions.

The removal of the water from the cured melamine-formaldehyde resins have to achieve by azeotropic distillation with a hydrocarbon or halogenated hydrocarbon that boils between 30° C. and 160° C.; as such relevant entraining agents there may be mentioned, for example, benzene, toluene, xylene, methylene chloride, chloroform, carbon tetrachloride, 1,2-dichlorethane or trichlorethylene.

The aforementioned dehydrating method is very efficient and yields substances having a particularly large specific surface area, and it enables the progress and the completion of the dehydration to be checked directly by measuring the amount of water separated. Following upon the removal of water, the azeotroping liquid must be filtered off and the filter cake then oven-dried.

The disagglomeration of the dried melamine-formaldehyde resin to an average particle size of less than $5\mu$ may be carried out with any one of the usual comminuting machines such as ball mills, roller mills, hammer mills or air jet mills. Alternatively, if desired, the grinding operation may be performed before the drying, for example before the spray-drying, as a wet-grinding operation, though in general dry-grinding is preferred. If required, the dry-ground material may be sifted.

The resins obtained by the present process are stable powders that are fast to light and are distinguished by their large surface area, a low bulk weight and a low specific gravity. They are colorless but the air occluded in them makes them appear white. The resin powders are infusible and insoluble. They are stable towards heat, water, alkalies, acids and solvents. They do not conduct the electric current and are poor heat conductors.

The resin powders manufactured by the present process may be used as fillers, vehicles, reinforcing means, matting and thickening agents, and the like. They are particularly suitable for use as novel fillers and reinforcing agents for rubber. By virtue of their light, or pure white, color, they can be used with special advantage wherever the black color of carbonblack precludes its use, for example in the manufacture of white or light-colored rubber goods, such as domestic appliances, toys and vehicle tyres.

By comparative experiments it can be shown that the use of the melamine resin powder of the invention in rubber mixtures produces at least equally good mechanical properties as can be achieved with kaolin or silica gel. Rubber vulcanisates containing equal proportions of the melamine-formaldehyde resins of the invention have, however, a lower specific gravity. The resin powders may also be used as fillers or reinforcing agents in synthetic resins, such as polystyrene, polyvinyl chloride and the like. They may also be used as fillers for special types of paper.

Furthermore, the new solid products may be used as vehicles for insecticides, acaricides, fungicides and other pesticides, to be used in the form of casting or dusting preparations. Another use is their incorporation in cosmetic powders or pastes, to replace talcum as a powder or paste base. Finally, the resins may be used as catalyst supports and for the manufacture of ion exchange resins.

In the following examples M/F signifies the molecular ratio of melamine to formaldehyde. The concentration K of melamine+formaldehyde in the batch is indicated in percent by weight; it is calculated from the formula $$K(\text{in }\%) = \frac{(\text{melamine} + \text{formaldehyde } [100\%]) \cdot 100}{\text{total weight of batch during condensation}}$$

All pH values have been corrected for 20° C.; they were measured with a glass electrode connected with a potentiometer accurate to 0.02 pH. Unless otherwise indicated, parts and percentages are by weight. The relationship between parts by volume to parts by weight is the same as that of the milliliter to the gram.

EXAMPLE 1

(M/F:=1:2; concentration: 14.6%)

A mixture of 126 parts of melamine and 200 parts of aqueous 30% formaldehyde solution is rapidly heated to 75° C. in a round-bottom flask equipped with a condenser, during which the melamine is dissolved. The batch is cooled to 20° C. and the melamine-formaldehyde precondensate is diluted with a solution of 28.6 parts of a 25% aqueous solution of a nonionic dispersant marketed under the registered trade name "Emulphor O" (obtained by condensing oleyl alcohol with ethylene oxide) and with 181 parts of a 50% aqueous solution of monobasic monoethanolamine phosphate in 500 parts of water. The mixture has at 20° C. a pH value of 7.03; it is adjusted to pH 2.22 with concentrated hydrochloric acid ($d = 1.19$). Already at pH=6.4 a white precipitate begins to form. 107.3 parts by volume of hydrochloric acid are consumed. 108.7 parts of water are added and the batch is heated to 45° C., and after 1½ hours a stiff, white gel has formed. It is heated for another 3½ hours at 45° C. and the gel is then stirred with 1800 parts of water and 600 parts of concentrated ammonia to form a white paste which is kept overnight, then filtered and rinsed with water until no more chlorine ions can be detected in the filtrate. The moist filter cake is azeotroped with benzene until no more water separates. The whole is filtered and the filter cake dried for 10 hours at 120° C., to yield 153 parts of a white product which is ground for 10 hours in a porcelain ball mill. The resulting powder is sifted through a sieve having an inner mesh size of 0.1 mm. It has a specific surface area of 147 square meters per gram.

EXAMPLE 2

(M/F=1:2; concentration: 14.6%)

The procedure is the same as in Example 1, but the pH is initially adjusted to 1.05 instead of to 2.22, which requires 136 instead of 107.3 parts by volume of concentrated hydrochloric acid. In this case only 80 instead of 108.7 parts of water are added. Instead of drying the powder, still moist with benzene, at 120° C., it is dried for 2 hours at 140° C. at 11 mm. Hg, to yield 154 parts of a fine, white powder which has a specific surface area of 113 square meters per gram after having been ground in the usual manner in a porcelain ball mill.

EXAMPLE 3

The procedure is the same as in Example 1, except the pH is initially adjusted to 0.68, which requires 150.5 parts by volume of concentrated hydrochloric acid. The water added amounts to only 65.5 instead of to 108.7 parts. There are obtained 150 parts of a white, fine powder having a specific surface area of 136 square meters per gram.

EXAMPLE 4

(M/F=1:4; concentration: 19%)

A mixture of 4 parts of a 50% aqueous solution of monobasic monoethanolamine phosphate and 400 parts of a 30% aqueous formaldehyde solution is adjusted with N-sodium hydroxide solution to pH 6.00, which requires 13.5 parts by volume. The batch is heated with 126 parts of melamine to 60° C. After 15 minutes a clear, colorless solution has been formed. The solution is cooled to 20° C., whereupon the pH is 6.85, then diluted with a solution of 7 parts of Turkey red oil and 209 parts of a 50% solution of monobasic monoethanolamine phosphate in 365 parts of water and finally adjusted with 162 parts by volume of dilute hydrochloric acid (1 part by volume of concentrated hydrochloric acid+1 part of water) to pH 2.70. The batch is heated for 6 hours at 45° C. and the resulting solid, white gel is then comminuted with the aid of a stirrer with 1100 parts of water and 138 parts by volume of concentrated ammonia to form a white paste of pH 8.0. After the paste has been left to itself for 10 hours, it is washed with water until no more chlorine ions can be detected in the filtrate. The moist filter cake is subjected to azeotropic distillation with benzene until no more water separates. The product is filtered off and dried in a vacuum drying oven at 30° C. for 72 hours until its weight remains constant. There are obtained 172 parts of a white powder which is ground for 4 hours in a porcelain ball mill. The powder is passed through a sieve having an internal mesh size of 0.1 mm. It has a bulk weight of 10 g. per 100 ml. and a specific surface area of 322 square meters per gram.

EXAMPLE 5

(M/F=1:4; concentration: 23%)

The procedure of Example 4 is used, except that there are used: 262 instead of 365 parts of water; instead of 7 parts of Turkey red oil 18.2 parts of a 25% aqueous solution of the nonionic dispersant "Emulphor O" used in Example 1 and 108 instead of 209 parts of the 50% aqueous solution of monobasic monoethanolamine phosphate. To establish a pH of 2.70, 127 parts (instead of 162) by volume of dilute hydrochloric acid are consumed. There are obtained 191 parts of a fine, white powder having a bulk weight of 18 g. per 100 ml. and a specific surface of 354 square meters per gram.

EXAMPLE 6

(M/F=1:4¾; concentration: 16%)

A mixture of 126 parts of melamine and 475 parts of 30% aqueous formaldehyde solution is heated to 82° C. in a reactor equipped with stirrer and reflux condenser, during which the melamine passes into solution. The clear, colorless solution is cooled to 20° C. and diluted with a solution of 70 parts of a 10% aqueous solution of cationic detergent (consisting of the hydrochloride of monooleyl-diethyl ethylenediamine) and 240 parts of a 50% aqueous solution of monobasic monoethanolamine phosphate in 700 parts of water. The batch is then acidified with 57.7 parts by volume of concentrated hydrochloric acid until the solution has reached a pH of 3.18, and then heated for 6 hours at 45° C. After 26 minutes the reaction product has been transformed into a white paste and 6 hours later into a white solid. The solid is comminuted by means of a stirrer with 2000 parts of water and 800 parts of concentrated ammonia and then kept overnight, filtered and washed with water until the filtrate runs neutral and no longer contains any chlorine ions. The moist filter cake is azeotroped with benzene until no more water separates. The product is filtered off and dried at 80° C. until its weight remains constant and then ground for 3 hours in a steel ball mill, to yield 167 parts of a fine, white powder which has a specific surface area of 123 square meters per gram.

EXAMPLE 7

(M/F=1:6; concentration: 18.7%)

A mixture of 126 parts of melamine and 600 parts of 30% aqueous formaldehyde solution is heated to 80° C., with the melamine passing into solution. The batch is cooled and diluted with a solution of 5 parts of a nonionic wetting agent (being a reaction product of 70 mols of ethylene oxide with a mixture of higher fatty amines containing 16 to 22 carbon atoms) in 650 parts of water, and with 238 parts of a 50% aqueous solution of monobasic monoethanolamine phosphate. The whole is then acidified with 30 parts by volume of concentrated hydrochloric acid to a pH value of 4.47. The batch is then heated for 5 hours at 45° C. and yields a white solid gel. The melamine-formaldehyde resin is isolated as described in Example 4, to yield 162 parts of a fine, white powder which has a specific surface area of 117 square meters per gram.

EXAMPLE 8

(M/F=1:4; concentration: 22.4%)

162 parts of melamine are dissolved in 400 parts of 30% aqueous formaldehyde at 80° C. The batch is cooled to 20° C. and diluted with a solution of 52.4 parts of diammonium phosphate in 423 parts of water and 19.6 parts of a 25% aqueous solution of the nonionic detergent "Emulphor O" used in Example 1, and finally adjusted to pH 2.45 with 79.2 parts of concentrated hydrochloric acid. The batch is then heated for 5 hours at 45° C. The resulting solid, white gel is comminuted, pasted with water, made alkaline with ammonia and then left for 2 hours, then filtered and washed with water until no more chlorine ions can be detected in filtrate. The moist filter cake is subjected to azeotropic distillation with benzene until no more water separates. The product is filtered off and dried at 80° C. until its weight remains constant and then ground for 20 minutes with a steel ball mill agitated at 50 oscillations per second. The resulting white powder is passed through a sieve having an internal mesh size of 0.1 mm. It has a specific surface area of 174 square meters per gram.

EXAMPLE 9

The procedure of Example 8 is used, except that instead of 52.4 parts of diammonium phosphate there are used 52.4 parts of neutral ammonium tartrate, and instead of 79.2 parts 84.5 parts of concentrated hydrochloric acid are used. In this case the pH is adjusted to 2.29 instead of 2.45. The resulting white powder has a specific surface area of 141 square meters per gram.

EXAMPLE 10

The procedure of Example 5 is used, except that the reaction solution is caused to gel by being kept for 24 hours at 4° C. instead of 6 hours at 45° C. The resulting white powder has a bulk weight of 9.3 g. per 100 ml. and a specific surface area of 142 square meters per gram.

EXAMPLE 11

The procedure of Example 5 is used, except that the reaction solution is caused to gel by keeping the temperature for 6 hours at 70° C. instead of at 45° C. The resulting white powder has a bulk weight of 26 g. per 100 ml. and a specific surface area of 377 square meters per gram.

EXAMPLE 12

The procedure of Example 5 is used, except that instead of heating the reaction solution for 6 hours at 45° C. it is heated in an autoclave to 140° C. to cause it to gel. When the latter temperature has been reached, the batch is cooled to room temperature, to yield a white powder which has a bulk weight of 6.5 g. per 100 ml. and a specific inner surface of 238 square meters per gram.

EXAMPLE 13

On a twin-roll mill a mixture was prepared from 100 parts of natural rubber, 2 parts of stearic acid, 5 parts of zinc oxide, 30 parts of the melamine-formaldehyde powder obtained according to Example 7, 3 parts of diethyleneglycol, 2 parts of the plasticiser marketed by Messrs. Sun Oil Co. under the registered trade mark "Circologht Process Oil" (being a naphthenic petroleum fraction which has a flash point of 165° C. and contains 19% of aromatic carbon atoms, 40% of naphthenic carbaon atoms and 41% of paraffinic carbon atoms), 2.3 parts of sulfur, 0.8 part of the vulcanisation accelerator "Santocure" and 0.3 part of zinc diethyl dithiocarbamate. After 10 minutes' vulcanisation at 143° C., the resulting light-colored, homogeneous test objects displayed the following properties.

Tensile strength (ASTM D 412)—284 kg./cm.$^2$
Modulus at 300% elongation (ASTM D 412)—164 kg./cm.$^2$
Elongation at break (ASTM D 412)—470%
Shore hardness A—67
Tear resistance (ASTM D 624)—131 kg./cm.
Specific gravity—1.06

EXAMPLE 14

On a twin-roll mill a mixture is prepared from 100 parts of polyvinyl chloride, 45 parts of dioctylphthalate, 0.7 part of barium laurate, 0.7 part of cadmium laurate and 1 part of the melamine-formaldehyde powder obtained in Example 5, which was ground six times in a rod mill, and the mixture is gelled for 10 minutes. The foil, drawn off at a thickness of 0.5 mm., has a mat appearance, whereas a comparable foil without melamine-formaldehyde powder has a strong gloss.

We claim:
1. A process for the manufacture of finely dispersed, insoluble and infusible solid melamine-formaldehyde condensates, said condensates being suitable as reinforcing agents for rubber, wherein an aqueous solution of melamine and formaldehyde at the molecular ratio of from 1:1.5 to 1:6 is maintained at a temperature ranging from 20° C. to 100° C. and at a pH value ranging from 5 to 0, said aqueous solution further containing dissolved a surface active agent, the molecule of which is made up of a hydrophobic group and a hydrophilic groups, said surface active agent having a molecular weight of at most about 1000, whereby a solid phase is formed and separated from the said solution and said separated solid phase is then substantially freed from inorganic salts, the water subsequently is removed from said solid phase by azeotropic distillation with the aid of a hydrocarbon or halogenated hydrocarbon which boils between 30° C. and 160° C., and the obtained cured, insoluble and infusible product is then disagglomerated to an average particle size smaller than $5\mu$, the so-obtained powder having a specific surface area greater than 100 square meters per gram.

2. A process as claimed in claim 1, wherein the aqueous starting solution is prepared from a precondensate manufactured from 1 mol of melamine and 1.5 to 6 mols of formaldehyde at a pH value ranging from 5 to 10.

3. A process as claimed in claim 1, wherein the solid phase is formed in the presence of a buffer substance.

References Cited
UNITED STATES PATENTS

| | | | |
|---|---|---|---|
| 2,998,410 | 8/1961 | Jefts et al. | 260—67.6 |
| 3,251,800 | 5/1966 | Cooley et al. | 260—39 |

WILLIAM SHORT, Primary Examiner

HOWARD SCHAIN, Assistant Examiner

U.S. Cl. X.R.

260—3, 41, 853, 855, 856